Jan. 16, 1951         J. J. DIGBY         2,538,300
ENGINE STARTER GEARING
Filed Jan. 12, 1950
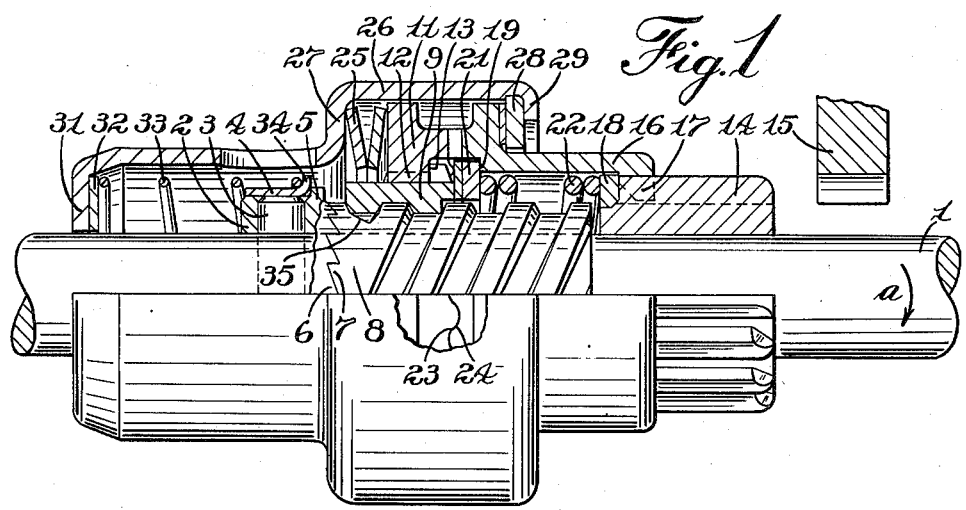
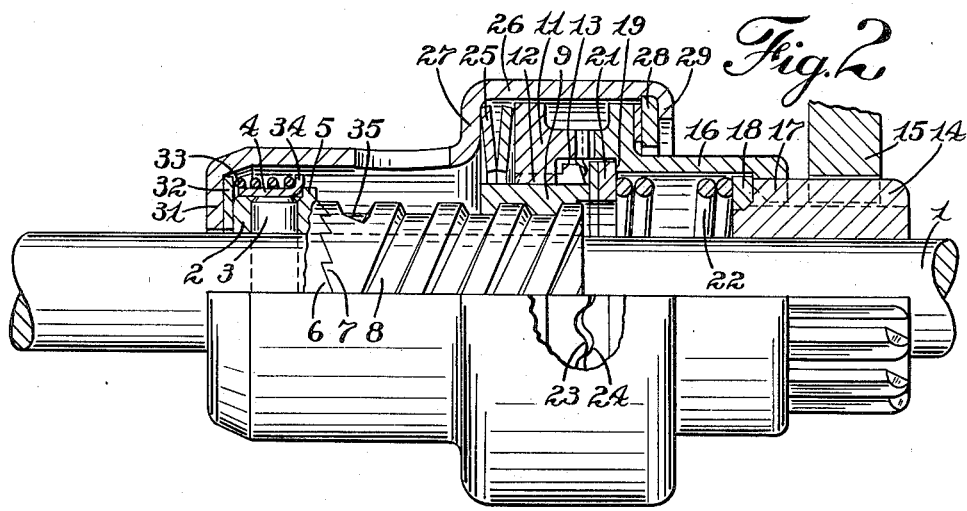
WITNESS:
Esther M. Stockton
INVENTOR.
James J. Digby
BY Clinton S. Janes
ATTORNEY Patented Jan. 16, 1951

2,538,300

UNITED STATES PATENT OFFICE 2,538,300

ENGINE STARTER GEARING

James J. Digby, Elmira, N. Y., assignor to Bendix Aviation Corporation, a corporation of Delaware Application January 12, 1950, Serial No. 138,171

8 Claims. (Cl. 74—7)

The present invention relates to engine starter gearing, and more particularly to a starter drive of the automatically engaging and disengaging type.

It is an object of the present invention to provide a starter drive of the above type which is efficient and reliable in operation and simple and economical in construction.

It is another object to provide such a device which includes a slip coupling for protecting the drive from overloads.

It is another object to provide such a device including means for preventing rebounding of the pinion toward the engine gear after it is thrown out of mesh.

It is another object to provide such a device which is arranged to ensure that the meshing operation takes place reliably and with little shock or noise.

Further objects and advantages will be apparent from the following description taken in connection with the accompanying drawing in which Fig. 1 is a side elevation partly broken away and in section of a preferred embodiment of the invention showing the parts in normal or idle position; and Fig. 2 is a similar view showing the parts in cranking position.

In Fig. 1 of the drawing there is illustrated a power shaft 1 on which a driving overrunning clutch member 2 is fixedly mounted as by means of a cross-pin 3, the pin being retained by means of a ring 4 which is seated against a flange 5 on the driving clutch member.

The driving clutch member 2 is provided with overrunning clutch teeth 6 arranged to cooperate with similar clutch teeth 7 on a hollow screw shaft 8 which is slidably journalled on the power shaft 1. A control nut 9 is threaded on the screw shaft 8, and a driving coupling member 11 is splined on the control nut as indicated at 12, normally resting against a stop shoulder 13 on the control nut.

A pinion 14 is slidably journalled on the power shaft 1 for longitudinal movement into and out of mesh with a gear 15 of an engine to be started. A driven coupling member 16 is splined on the pinion 14 as indicated at 17, in telescopic relation therewith, the extension of the pinion beyond the end of the driven coupling member being limited by a stop ring 18 fixed on the end of the pinion.

The driven coupling member 16 is provided with an internal shoulder 19, and one or more thrust washers 21 are arranged to seat against said shoulder 19 and to bear against the end of the control nut 9 so as to transmit meshing movement from the control nut to the driven coupling member. A mesh-enforcing compression spring 22 within the driven coupling member 16 bears at its ends against the stop ring 18 and thrust washer 21 respectively so as to yieldingly maintain the pinion 14 in extended relation with respect to the driven coupling member 16.

The driving coupling member 11 is formed on one side with undulations providing inclined torque transmitting surfaces 23 which engage corresponding inclined surfaces 24 on the driven coupling member 16. A compression spring 25 which may be composed of one or more spring washers is arranged to engage the driving coupling member 11; and said spring, and the coupling members are maintained under compression by means of a barrel member 26 having a shoulder 27 engaging the spring 25, and the thrust ring 28 engaging the driven coupling member and retained in the barrel by an inturned flange 29 on the end of the barrel.

The opposite end of the barrel 26 is provided with an inwardly extending flange 31 bearing on the power shaft 1 and arranged to come into abutting relation with the driving clutch member 2 when the pinion 14 has been fully meshed with the engine gear 15 as shown in Fig. 2, a thrust washer 32 being preferably interposed therebetween. An anti-drift spring 33 is seated at one end on the retaining ring 4 against a flange 34 thereon, and bears at its other end against the thrust washer 32 so as to urge the barrel 26 and its associated parts toward idle position. The screw shaft 8 is provided with shoulders 35 at the ends of the threads thereon so as to limit the travel of the control nut 9 in the direction to demesh the pinion 14 from the engine gear 15.

In operation, starting with the parts in the positions illustrated in Fig. 1, rotation of the power shaft 1 in the direction of the arrow $a$ by the starting motor, not illustrated, is transmitted through the driving overrunning clutch member 2 through the teeth 6 and 7 to the screw shaft 8, whereby the control nut 9 is traversed along the screw shaft to the right, which motion is transmitted through the thrust washer 21 to the driven coupling member 16, and through the mesh-enforcing spring 22 to the pinion 14 so as to move it into mesh with the engine gear 15. The motion of the driven coupling member 16 is transmitted through the thrust ring 28 to the barrel 26 which accordingly moves the spring 25 and driving coupling member 11 in unison with the control nut 9.

As soon as the flange 31 of barrel 26 engages the driving clutch member 2, longitudinal movement of the barrel, driven coupling member and pinion is arrested, and further rotation of the screw shaft causes torque to be transmitted through the driving coupling member 11 and the inclined surfaces 23, 24 to the driven coupling member 16 and from thence to the pinion 14 thereby causing rotation of the engine gear 15. Should the initial torque transmitted through the power shaft exceed a predetermined maximum, the inclined surfaces 23, 24 of the coupling members 11, 16 cam these members apart, compressing the spring 25 as illustrated in Fig. 2 until the surfaces 23 of the driving coupling member slip over the corresponding surfaces 24 of the driven coupling member, whereby the maximum torque transmitted through the drive is limited by the stiffness and the degree of compression of the spring 25.

Should, during the meshing movement, the teeth of the pinion 14 come into abutting relation with the teeth of the gear 15, the longitudinal movement of the pinion is arrested while the control nut 9, coupling members 11, 16 and barrel 26, continue their longitudinal movement, compressing the mesh-enforcing spring 22. When the torque so built up becomes sufficient to index the pinion teeth into registry with the tooth spaces of the engine gear, the mesh-enforcing spring 22 snaps the pinion into mesh with the engine gear, and the meshing and cranking operations proceed as usual.

When the engine starts, the acceleration of the pinion and its associated parts causes the control nut 9 to thread itself back on the screw shaft 8 while the anti-drift spring 33 expands and draws the parts back to idle position. When the control nut engages the shoulders 35 at the ends of the threads of the screw shaft, the entire assembly, including the pinion and screw shaft, overruns the driving clutch member 2 until they slow down to the speed of the power shaft. In this manner rebounding of the longitudinally movable parts so as to cause the pinion to reengage the flywheel is effectively prevented.

Although but one embodiment of the invention has been shown and described in detail, it will be understood that other embodiments are possible and that changes may be made in the design and arrangement of the parts without departing from the spirit of the invention.

I claim:

1. In an engine starter drive a power shaft, a driving overrunning clutch member fixed thereon, a driven overrunning clutch member in the form of a hollow screw shaft slidably journalled on the power shaft in position to cooperate with the driving clutch member, a control nut threaded on the screw shaft, a pinion slidably journalled on the power shaft for movement into and out of mesh with a gear of an engine to be started, a coupling member splined on the control nut having inclined driving surfaces, a driven coupling member splined to the pinion having cooperating inclined driven surfaces, a thrust connection from the nut to the driven coupling member, means for limiting the travel of the driven coupling member in the meshing direction including a barrel member surrounding the coupling and clutch members, and having a terminal flange arranged to come into abutting relation with the driving clutch member.

2. An engine starter drive as set forth in claim 1 including further yielding means in the barrel for resisting separation of the coupling members.

3. An engine starter drive as set forth in claim 2 including further yielding means in the driven coupling member resisting telescoping movement of the pinion therein, and means for limiting the extension of the pinion from the driven coupling member.

4. An engine starter drive as set forth in claim 2 in which the screw shaft has an abutment limiting the demeshing movement of the control nut thereon, and including further yielding means urging the terminal flange of the barrel away from the driving clutch member.

5. In an engine starter drive a power shaft, a driving clutch member fixed thereon, a screw shaft slidably journalled on the power shaft having an overrunning clutch connection with the driving clutch member, a control nut threaded on the screw shaft, a driving coupling member splined on the control nut, a pinion slidably journalled on the power shaft for longitudinal movement into and out of mesh with a gear of an engine to be started, a driven coupling member splined on the pinion in telescopic relation therewith and having an internal thrust shoulder, a thrust washer seated against said shoulder and in abutting relation to the control nut, said pinion having a stop ring limiting the extension of the pinion from the driven coupling member, and a mesh-enforcing spring in the driven coupling member bearing at its ends on the thrust washer and the stop ring.

6. An engine starter drive as set forth in claim 5 in which the coupling members are provided with inclined torque-transmitting surfaces; and including further a coupling spring bearing against one of the coupling members, and means including a barrel member surrounding the coupling members and maintaining them under compression through said coupling spring.

7. An engine starter drive as set forth in claim 6 in which the barrel member cooperates with the driving clutch member to limit the meshing movement of the coupling members and pinion.

8. An engine starter drive as set forth in claim 7 in which the screw shaft is provided with an abutment limiting the demeshing movement of the control nut thereon; and including further, yielding means urging the barrel member in the direction to demesh the pinion.

JAMES J. DIGBY.

No references cited.